United States Patent
Ronacher et al.

(10) Patent No.: US 7,213,872 B2
(45) Date of Patent: May 8, 2007

(54) FIRE ENGINE

(75) Inventors: Alexander Ronacher, Hörsching (AT); Franz Hochdaninger, Lauffen (AT)

(73) Assignee: Rosenbauer International Aktiengesellschaft, Leonding (AT)

( * ) Notice: Subject to any disclaimer, the term of this patent is extended or adjusted under 35 U.S.C. 154(b) by 294 days.

(21) Appl. No.: 10/498,533

(22) PCT Filed: Dec. 13, 2002

(86) PCT No.: PCT/AT02/00350

§ 371 (c)(1),
(2), (4) Date: Feb. 4, 2005

(87) PCT Pub. No.: WO03/049987

PCT Pub. Date: Jun. 19, 2003

(65) Prior Publication Data

US 2005/0115752 A1    Jun. 2, 2005

(30) Foreign Application Priority Data

Dec. 13, 2001   (AT)   ............... A 1957/2001

(51) Int. Cl.
*B62D 33/067* (2006.01)
(52) U.S. Cl. .................... 296/190.05; 296/166; 169/24
(58) Field of Classification Search ........... 296/190.01, 296/190.05, 37.1, 166; 169/24
See application file for complete search history.

(56) References Cited

U.S. PATENT DOCUMENTS

| | | | |
|---|---|---|---|
| 4,121,684 A | | 10/1978 | Stephens et al. |
| 4,294,485 A | | 10/1981 | Engelhard |
| 4,351,554 A | | 9/1982 | Miller |
| 4,378,856 A | * | 4/1983 | Miller ...................... 180/89.14 |
| 6,840,529 B2 | * | 1/2005 | Call ........................... 280/403 |
| 2006/0137886 A1 | * | 6/2006 | Cano ........................... 169/24 |

FOREIGN PATENT DOCUMENTS

| | | | |
|---|---|---|---|
| AT | 406 573 B | | 6/2000 |
| DE | 3526766 A1 | | 5/1986 |
| DE | 3826542 | | 2/1990 |
| GB | 2166094 A | * | 4/1986 |

OTHER PUBLICATIONS

International Search Report Apr. 22, 2003.
AT Office Action Sep. 25, 2002.

* cited by examiner

*Primary Examiner*—Jason Morrow
(74) *Attorney, Agent, or Firm*—RatnerPrestia

(57) ABSTRACT

A truck, in particular a fire-fighting utility vehicle. The vehicle has a structure mounted on a chassis frame with a driver's cab pivotable about a horizontal axis extending transversely to the travel direction. A crew and/or equipment cab is also mounted on the chassis frame communicating with the driver's cab via a releasable connecting mechanism forming a passageway. Independently of the driver's cab and the crew and/or equipment cab, a utility structure is mounted on the chassis frame having built-in fixtures for storing tools and equipment and optionally having extinguisher units consisting of at least a tank, extinguisher pump, etc. and mounting devices are provided at entry and/or operating openings in transverse and/or longitudinal side walls of the structure.

29 Claims, 10 Drawing Sheets

FIRE ENGINE

This is a U.S. National Phase application of PCT International Application Number PCT/AT02/00350, International Filing Date Dec. 13, 2002.

FIELD OF THE INVENTION

The invention relates generally to a truck and, in particular, to a fire-fighting utility vehicle.

BACKGROUND OF THE INVENTION

Patent specification DE 35 26 766 A1, filed by the same applicant, discloses a truck with mutually separate and independent cabs disposed at the front end of the vehicle chassis, comprising a driver's cab with all the controls needed to operate the truck and a crew and/or equipment cab immediately behind. The driver's cab, which also has seats for passengers, is linked to the crew and/or equipment cab by openings in a rear wall of the driver's cab and a front wall of the crew and/or equipment cab facing it, forming a passageway for persons. A sealing arrangement surrounding the openings provides a closure sealed off from the outside. In the region of the forward front wall, the driver's cab of the truck is mounted on the vehicle chassis so that it can pivot about an axis extending parallel with a support surface and perpendicular to the travel direction, in order to provide access to the drive motor and auxiliary units disposed underneath the floor in the event of maintenance work. The disadvantage of such an arrangement is the inconvenient manipulation needed to detach the seal arrangement from the driver's cab and to enable the driver's cab to be pivoted.

An entry to the driver's cab of a utility vehicle, in particular for a cab-over-engine truck, is known from patent specification DE 38 26 542 A1, whereby entry to the driver's cab of a utility vehicle is facilitated by entry steps in the form of rotating steps. When the entry doors to the driver's cab are opened, these can be moved at the same time from a pivoted-in position at the exterior front into an outwardly pivoted position or can be moved by a separate drive system. The rotating steps are mounted on an axis within the structure, extending perpendicular to the support surface, and the steps have more or less circular cut-out faces in their projection towards the support surface. This affords the vehicle driver effortless entry to the driver's cab, but inadvertent pivoting during entry is detrimental to the safety of the user.

Patent specification AT 406 573 B discloses a box structure for a utility vehicle, in particular a fire-fighting vehicle, in which a passageway linking the driver's cab and the box structure is provided between the driver's cab and a front-end transverse support element for the box structure lying behind, and a peripheral elastic transition and sealing element is disposed in the region of side walls of the box structure and a roof support plate, which produces a sealed connection but does not prevent various vibrations. A transition and sealing element of this type represents a very complex system if the intention is to provide a pivotable driver's cab.

The objective of the present invention is to provide a truck, in particular a fire-fighting utility truck, which is easy to handle during maintenance and during operation and which is operationally reliable during different conditions of usage.

SUMMARY OF THE INVENTION

This objective is achieved by the invention as a result of the following features. A truck, in particular a fire-fighting utility vehicle, is provided having a structure mounted on a chassis frame with a driver's cab pivotable about a horizontal axis extending transversely to the travel direction and at least one other crew and/or equipment cab mounted on the chassis frame communicating with the driver's cab via a releasable connecting mechanism forming a passageway. A utility structure independent of the driver's cab and the crew and/or equipment cab is mounted on the chassis frame and has built-in fixtures for storing tools and equipment and optionally has extinguisher units consisting of at least one tank for extinguisher medium and an extinguisher pump with a flow connection to the tank via extinguisher lines and with entry and/or service openings in transverse and/or longitudinal side walls of the structure. The connecting mechanism is a flexible bellows seal element which is secured by a fixing frame to a transverse wall of the crew and/or equipment cab and releasably connected to a rear wall of the driver's cab (6) by a retaining connection. A mounting device is provided in the region of at least one entry opening of the crew and/or equipment cab.

The surprising advantage of this solution resides in the fact that, for a cabin structure of this type consisting of a driver's cab and crew and/or equipment cab, the utility vehicle can be prepared in readiness for maintenance work to be performed on the drive and equipment units, which are often disposed under the floor, even though the requirements of utility vehicles are higher in terms of free floor space, while also providing a rapid and safe entry for the crew.

A further embodiment, in which a roof frame is provided on the rear wall of the driver's cab which encloses certain regions of the bellows seal element, is of advantage because the direct abutment region of a bellows seal element on the rear wall of the driver's cab is secured against access from outside and a roof frame of this type also affords protection for the bellows seal element against mechanical damage.

As a result of another advantageous embodiment, the retaining connection is provided in the form of permanent magnets disposed in the stop frame. In this embodiment, the driver's cab can be pivoted upwards in order to expose the units located under the floor without the need for lengthy manipulation of fixing devices, and the damage which often occurs due to incorrect preparation of a pivoting maneuver is ruled out.

Several permanent magnets may be disposed on the stop frame, spaced apart from one another in the circumferential direction of the stop frame. This embodiment provides a structurally simple construction for retaining the permanent magnets by which the coupling is obtained.

As a result of the advantageous embodiment in which elastic absorber elements are provided on the roof frame facing the stop frame, vibrations are decoupled, thereby reducing stress on the mechanical components caused by vibration.

The stop frame may be a hollow section, in particular a rectangular section, and the permanent magnets may be disposed in a cavity of the hollow section. As a result of these preferred embodiments, the bellows seal element is reliably connected to the rear wall of the driver's cab, even under the high strain caused by impacts and vibrations during driving operation.

The roof frame may be a blanking section with a more or less L-shaped cross section, which is secured to the rear wall by one leg and the other leg projects at a right angle in the direction of the transverse wall. The length of the projecting leg may be approximately two-thirds of the distance between the rear wall and the transverse wall. The bellows seal element may be secured by a frame section with an approximately U-shaped cross section to the transverse wall or to a cut-out in the latter. These embodiments are also of advantage because they provide a simple way to protect the bellows seal element against mechanical damage and the pivoting procedure by which the driver's cab is pivoted upwards can proceed unhindered.

The embodiment in which the bellows seal element is made from flexible, rubber-backed linen fabric, fiber-reinforced plastic, and the like results in a long service life and good operating reliability.

The bellows seal element and stop frame joined to the bellows seal element may be held in position relative to the transverse wall by a retaining arm. An adjustable supporting rope system, spring arrangement, or the like may be disposed between the retaining arm and the stop frame. The spring arrangement may be provided with an adjusting mechanism for adjusting the positioning of the stop frame with respect to its position relative to the transverse wall. As a result of these advantageous embodiments, the connecting mechanism is accurately docked in position when the connection is re-established as the driver's cab is pivoted from the pivoted-up position back into the normal position without the need for manipulation to obtain the correct positioning.

The embodiment in which the stop frame is preferably made from aluminium, while the roof frame and the frame section are preferably made from sheet steel, provides inexpensive and durable elements.

In several additional embodiments of the present invention, the mounting device is provided in the form of a multi-level step element which is pivotable within an external boundary of the structure about a pivot axis extending perpendicular to a support surface. The step element is pivotable from a pivoted-in position, in which a wall part extends flush with the external boundary, into a pivoted-out position, in which the wall part assumes an angle of between 0 and 90 degrees. The step element is supported by an underside of a step projection on a brake arm fixedly connected to the structure when placed under load, irrespective of the pivoted position it assumes. A brake pad is provided on the brake arm. The step element is mounted on the pivot axis so as to be displaceable in the direction of the support surface against the action of a spring force. A stowage compartment is provided in an interior of the step element. A light unit with a light-emitting surface in the direction of the step element is provided in the wall part in the region of the step element. The light unit is provided in the form of an electro-luminescent film on a surface of the wall part or the step element.

These advantageous embodiments make for very simple handling of the entry system in combination with the door position of an entry opening and, irrespective of the position, the position is guaranteed due to the load acting on it when walked on, preventing any further pivoting. No additional manipulations are needed for this purpose, which offers a high safety factor and relieves the crew using the entry system of extra tasks. This design of the step element ensures that there is no unprotected space in the extension of one of the doors when in the pivoted open position, thereby preventing any risk of falling.

In further embodiments of the present invention, walls forming the structure, in particular longitudinal side walls and roof panels, are provided in the form of panels with facing layers and insulation layers, e.g., metal/plastic, plastic/metal, plastic/plastic, and metal/metal. End faces of the panels are provided in the form of overlapping bent-back legs of the facing layers. A fixing mechanism such as bolts, rivets, and the like of the corner and/or abutting connections preferably runs with its longitudinal extension perpendicular to the end faces. Tension forces of the fixing mechanism preferably act in the direction perpendicular to the end faces of the panels.

These advantageous embodiments provide protected abutting and corner connections for panels of a composite structure consisting of facing layers and intermediate layers, without any risk of the layers coming apart due to stress, in particular stress caused by vibration. Strong retaining forces and simplified assembly are also guaranteed.

A drainage valve block incorporating valves in the pressure-suction line region of the extinguisher system may be provided for the extinguisher pump, pump lines, and extinguisher lines, establishing a flow connection with a cooling and/or heating circuit of a vehicle engine and through which cooling or heating medium is circulated. This embodiment is advantage because a supply system for fire extinguisher medium exposed to a risk of freezing is actively protected, ensuring that it will always be available for use, even under extreme conditions such as occur during winter operation.

Another possible embodiment includes a mast, which is displaceable in the direction perpendicular to the support surface, provided on the structure as a support for lighting. The mast is additionally provided with at least one camera. Pursuant to this embodiment, events at the deployment site can be visually transmitted and commander and/or crew can be supplied with the information they need in order to take decisions on deployment independently of the deployment vehicle.

Finally, according to another embodiment of the present invention, the control and monitoring unit has a removable, portable control and monitoring terminal which wirelessly communicates with the control and monitoring unit. This embodiment has advantages because crucial technical and communication equipment of the deployment vehicle needed for the deployment can additionally be controlled and monitored from a location that is independent of the deployment vehicle if necessary.

It is to be understood that both the foregoing general description and the following detailed description are exemplary, but are not restrictive, of the invention.

BRIEF DESCRIPTION OF THE DRAWINGS

To provide a clearer understanding of the invention, it will be described in more detail with reference to examples of embodiments illustrated in the appended drawings. Of these.

DETAILED DESCRIPTION OF THE INVENTION

Figure 1:
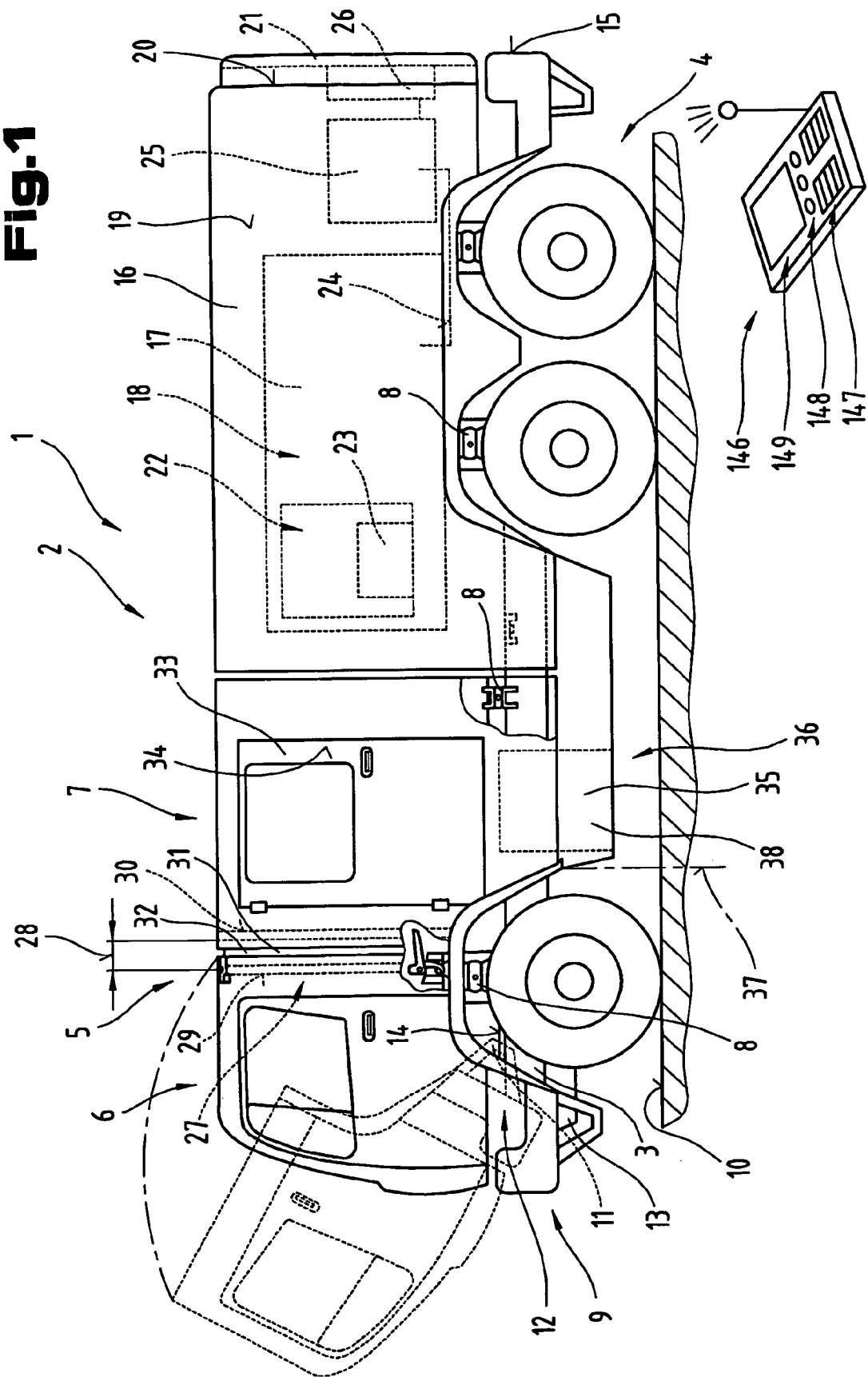
FIG. 1 is a view of a truck proposed by the invention, in particular a fire-fighting utility vehicle.

Firstly, it should be pointed out that the same parts described in the different embodiments are denoted by the same reference numbers and the same component names and the disclosures made throughout the description can be transposed in terms of meaning to the same parts bearing the same reference numbers or the same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 shows a truck 1, in particular a fire-fighting utility vehicle 2. A double cab 5 consisting of a driver's cab 6 and a crew and/or equipment cab 7 is mounted on a chassis frame 3 of a chassis 4 by absorber elements 8. The driver's cab 6 is mounted at a front-face end region 9 in a pivot bearing arrangement 12 on the chassis frame 3 so as to be pivotable about an axis 11 extending parallel with the support surface 10 and perpendicular to the longitudinal extension of the truck 1. This type of design is used on trucks 1 where a drive motor 13 and its auxiliary units are provided in the chassis frame 3, in other words underneath a floor 14 of the driver's cab 6, so as to allow access for carrying out maintenance and repair work on the drive motor 13 and its auxiliary units.

A structure 16 is also mounted on the chassis frame 3, adjoining the double cab 5 in the direction towards a rear end region 15 of the truck 1, which contains, for example, a tank 17 for fire extinguisher medium 18 and fixtures 22 surrounding it for accommodating equipment 23, e.g., tools, rescue apparatus, etc., which are accessible from roller shutters 21 disposed in longitudinal side walls 19 and transverse side walls 20. The utility structure 16 also contains a fire extinguisher pump 25 for pumping out the fire extinguisher medium connected to the tank 17 via a supply line 24, incorporating the requisite control and monitoring unit 26.

The driver's cab 6 is joined to the crew and/or equipment cab 7 by a sealed arrangement forming a passageway 27 and defining a distance 28 between a rear wall 29 of the driver's cab 6 and a transverse wall 30 of the crew and/or equipment cab 7 lying opposite it. The passageway 27 is bridged by a connecting device 31 essentially incorporating a bellows seal element 32.

As may also be seen from FIG. 1, a mounting device 36 is provided at one door 33 of an entry opening 34 of the crew and/or equipment cab 7 in the form of a step element 35. The step element 35 is mounted so as to be pivotable about a pivot axis 37 within the longitudinal side wall 19 of the crew and/or equipment cab 7 extending perpendicular to the support surface 10 and from a position, in which a wall part 38 extends flush with the longitudinal side wall 19, into an upwardly pivoted position projecting out beyond the longitudinal side wall 19 depending on an opening position of the door 33.

Other details regarding the fittings on the truck 1 designed for driving operation, accommodating persons, etc., need not be discussed individually since these are adapted to cater for the intended purpose of the truck 1 and are well known to those of skill in the art.

Figure 2:
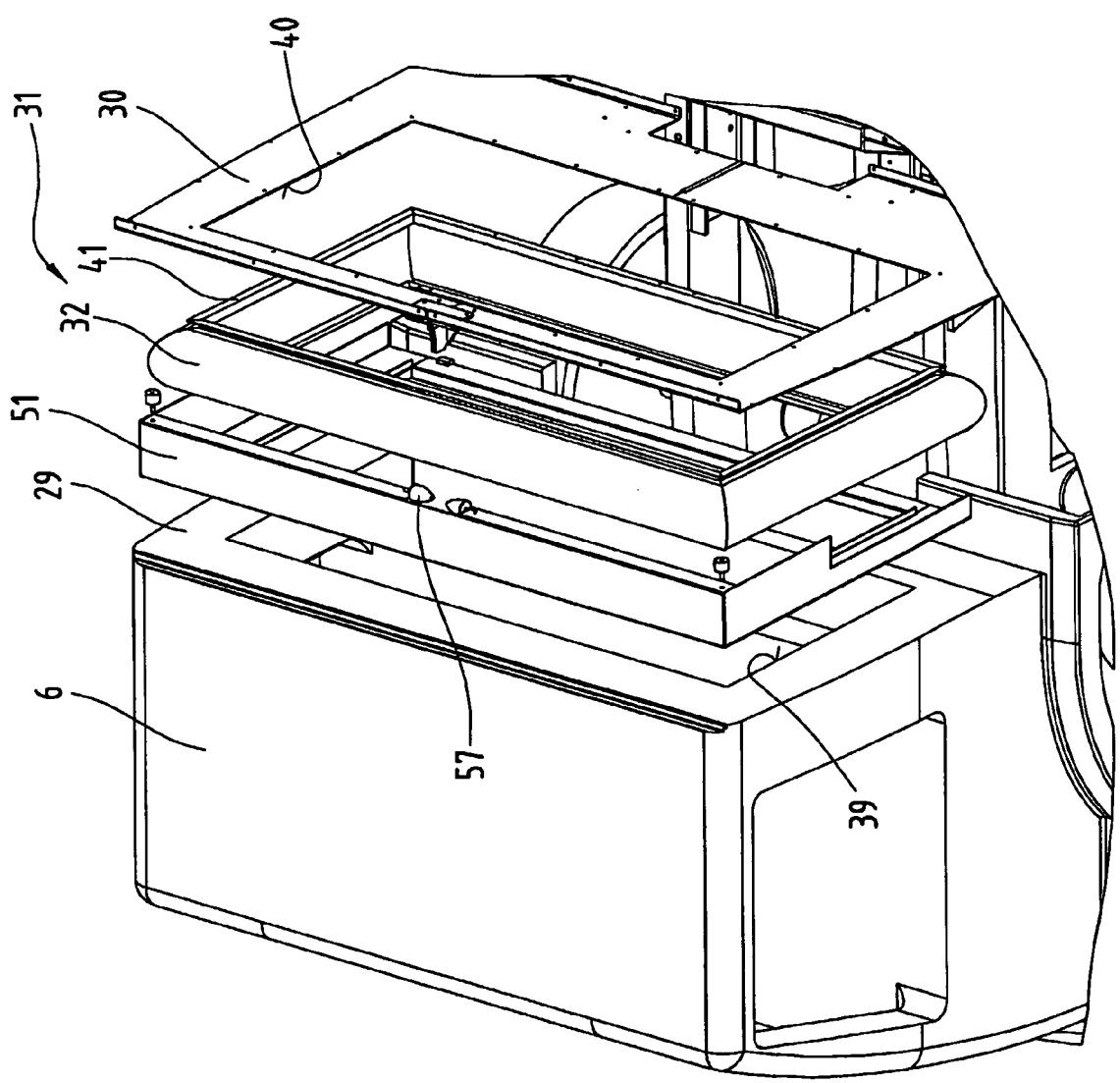
FIG. 2 is a perspective diagram showing a connection system between cabs of the vehicle proposed by the invention.
Figure 3:
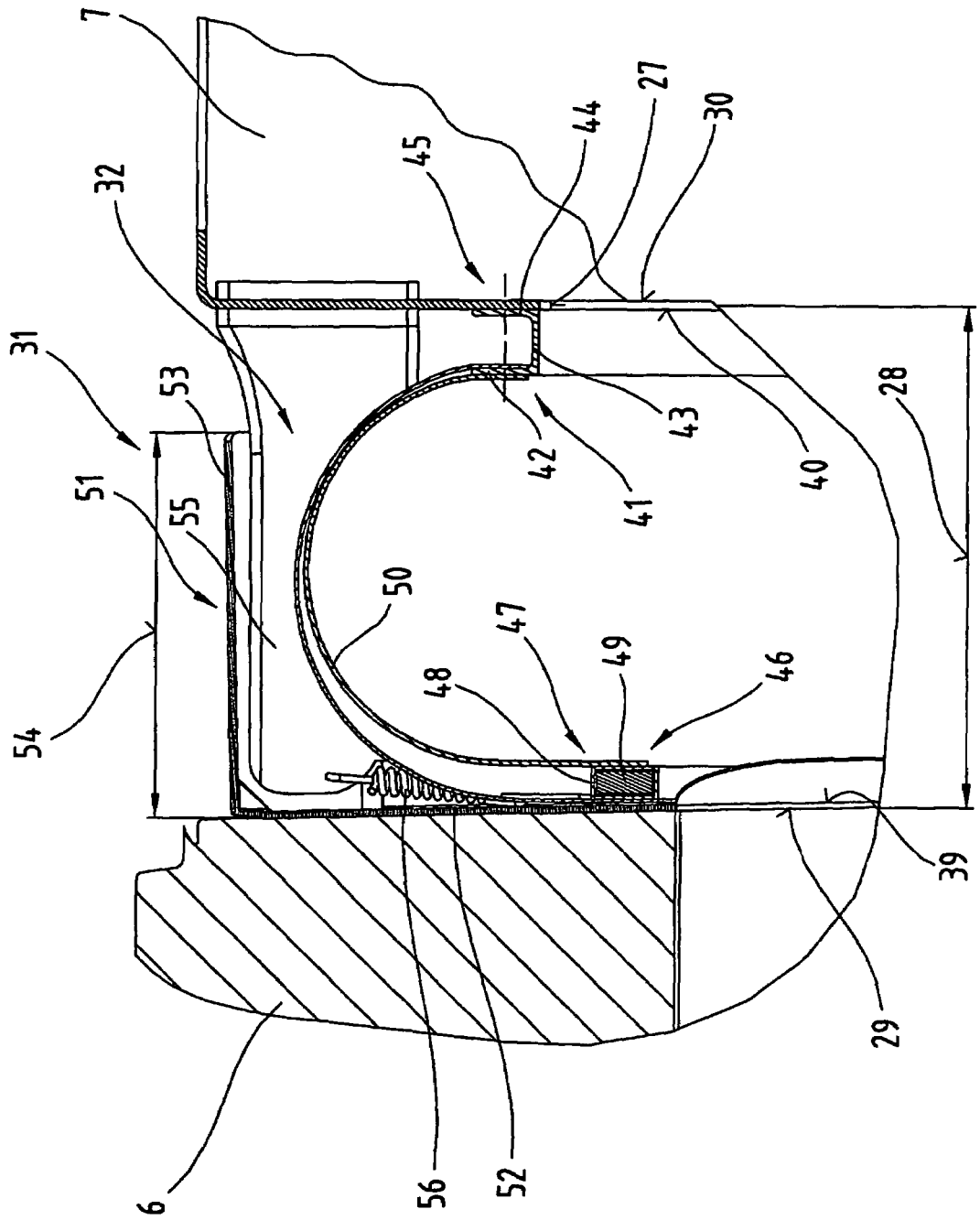
FIG. 3 shows the connection system viewed in section along the vehicle mid-plane.

FIGS. 2 and 3 provide detailed views of the connecting device 31, with FIG. 2 showing the individual elements forming the connecting device 31 separately in the form of assembly instructions and FIG. 3 illustrating the connecting device 31 fully assembled and in the docked state. A roof frame 51 is provided on the rear wall 29 of the driver's cab 6 which encloses certain regions of the bellows seal element 32. The rear wall 29 of the driver's cab 6 and the transverse wall 30 of the crew and/or equipment cab 7 have substantially rectangular cut-outs 39, 40 forming the passageway 27. This provides a direct walk-through connection between the driver's cab 6 and the crew and/or equipment cab 7. In order to seal the passageway 27 from the outside environment, the cut-outs 39, 40 are disposed in a frame-type arrangement between the rear wall 29 of the driver's cab 6 and the transverse wall 30 of the crew and/or equipment cab 7 enclosing the distance 28 bridging the connecting device 31. They consist of the bellows seal element 32 made from a flexible material, e.g., a plastic-coated textile fabric, rubber, plastic, etc., which is joined to a fixing frame 41, e.g., a leg 42 of a U-section 43, and which is attached to another leg 44 on the transverse wall 30 of the crew and/or equipment cab 7 by a releasable connecting mechanism 45. This ensures a sealed connection of the bellows seal element 32 on the transverse wall 30.

The other sealed connection of the bellows seal element 32 on the rear wall 29 of the driver's cab 6 is formed by a detachable retaining connection 46. This retaining connection 46 is provided in the form of a stop frame 47, e.g., comprising a rectangular hollow section 48 surrounding the cut-out 39 in the rear wall 29, in certain regions of which bar or strip-shaped permanent magnets 49 are disposed. When the driver's cab 6 is in the normal position, the magnetic retaining force of the permanent magnets 49 produces a tight abutment of the stop frame 47 and hence the bellows seal element 32 against the rear wall 29. In order to strengthen the flexible bellows seal element 32 and maintain its shape, arcuate curved stiffening ribs 50 made from spring steel strips, for example, are provided between the leg 42 of the fixing frame 41 and the hollow section 48 in a substantially arcuate curved cross-sectional shape.

To protect the bellows seal element 32 and improve the sealing arrangement by imparting a labyrinth gap to the structure, a ceiling frame is additionally provided, preferably on the rear wall 29, surrounding the cut-out 39 and the bellows seal element 32, formed by an L-shaped sheet metal section with one leg 52 secured to the rear wall 29 and another leg 53 projecting out so that it overlaps with the bellows seal element 32 in the direction of the crew and/or equipment cab. A leg width 54 of the projecting leg 53 is shorter than the distance 28. In order to stabilize the bellows seal element 32 with the stop frame 47 and assist its positioning relative to the position of the cut-out 39 in the rear wall 29 and hence also the transverse wall 30, the latter has affixed to it at least one retaining arm 55 projecting in the direction towards the driver's cab 6, on which the stop frame 47 is elastically and flexibly retained in position by a helical tension spring 56, for example.

On the one hand, this configuration ensures that the stop frame 47 can assume the basic position without any manual adjustment as the driver's cab 6 is tilted into the normal position when the stop frame 47 is being docked. On the other hand, the retaining action of the helical tension spring 56 compensates for the different movements of the driver's cab 6 and the crew and/or equipment cab 7 caused by the differing loads which occur during driving operation, without the retaining connection 46 working loose. Another possibility is to dispose elastic absorber elements 57 in the abutment region of the stop frame 47, on the roof frame (51) facing the stop frame (47), which will effectively damp vibrations and secure the position.

Figure 4:
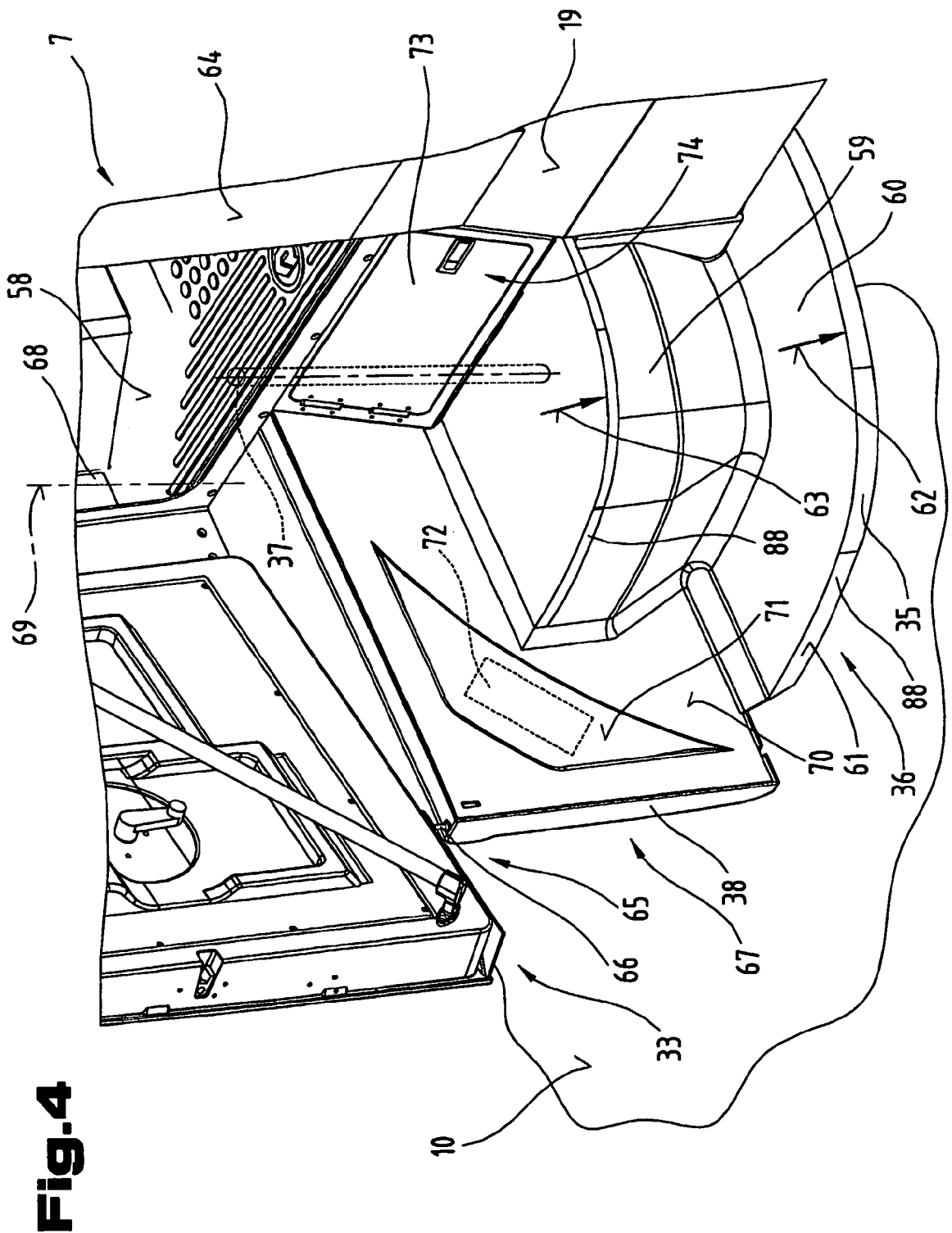
FIG. 4 is a perspective diagram showing the mounting device of the truck proposed by the invention.

FIG. 4 illustrates the mounting device 36 disposed in the longitudinal side wall 19, in the region of the door 33 underneath a floor 58 to facilitate entry to the crew and/or equipment cab 7. The mounting device 36 is illustrated in the pivoted-out position in FIG. 4, in which the step element 35, essentially consisting of two step levels 59, 60, can be used for mounting with the door in the pivoted open position. An outer contour line of the step element 35 substantially corresponds to the arc of a quarter circle, the step level 60 lying closer to the support surface 10 having a bigger radius 62 than a radius 63 of the step level 59 lying closer to the floor 58. The step element 35 is prevented from moving by the wall part 38, which extends flush with the longitudinal side wall 19 when the mounting device 36 is in the pivoted-in position.

As already described in connection with FIG. 1, the pivot axis 37 extends perpendicular to the support surface 10 and is disposed within an external surface 64 of the longitudinal side wall 19. In an end region 67 at a distance apart from the pivot axis 37, the door 33 is connected to the wall part 38 and hence to the step element 35 by an operating mechanism 65, e.g., a driver 66, so that it moves. The pivot axis 37 of the step element 35 is preferably eccentric to a pivot axis 69 of the door 33 formed by a hinge arrangement 68, the disposition of the pivot axis 37 relative to the pivot axis 69 being selected so that when the door 33 is pivoted open, the step element 35 is pivoted upwards in advance. Naturally, a flush arrangement of the pivot axes 37, 69 would also be possible, in which case the door 33 and the step element 35 would have an identical pivot angle.

As may also be seen from FIG. 4, a light-emitting surface 71 is provided in an internal surface 70 facing the step levels 59, 60 to provide illumination from an integrated light unit 72 disposed inside the wall part 38.

Also of advantage is the fact that a stowage compartment 74 for small objects, tools, etc., is provided in unused cavities in the step element 35, which can be closed off by a flap 73, for example.

Figure 5:
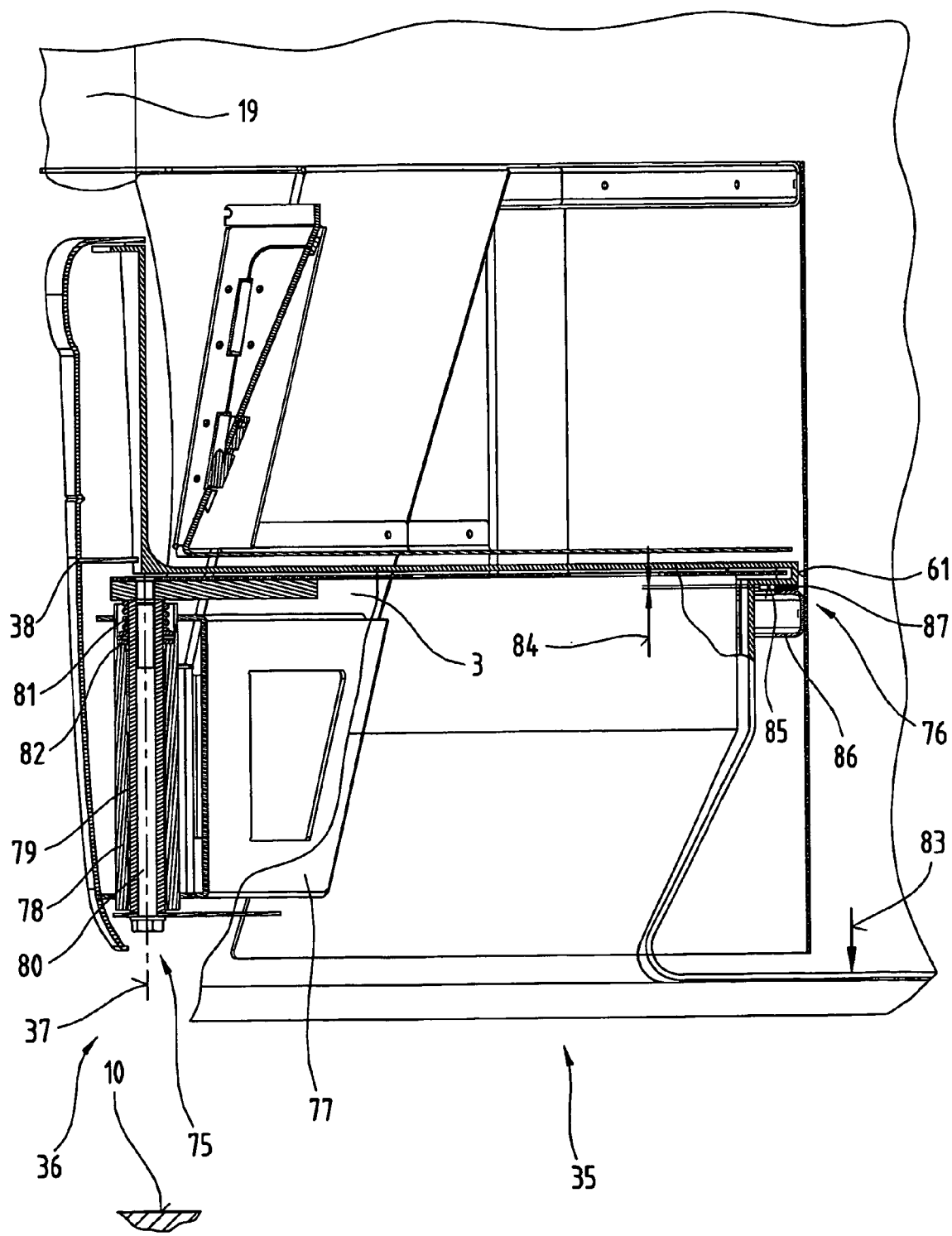
FIG. 5 shows a partial section of the mounting device.

FIG. 5 provides a detailed illustration of the mounting device 36 with a bearing arrangement 75 forming the pivot axis 37 and a locking mechanism 76 to prevent any pivoting movement when the step element 35 is placed under load. In the position illustrated, the mounting device 36 is in its pivoted-in position. This being the case, the wall part 38 joined to the step element 35 extends flush with the longitudinal side wall 19.

Secured to the chassis frame 3 by a bearing bracket 77 is a guide tube 78, in which a bearing tube 79 displaceable with the step element 35 is mounted. The guide tube 78 pivotably accommodates the bearing tube 79 and a central fixing mechanism 80 extends through the bearing tube 79 in the direction of the pivot axis 37 enabling the mounting aid to be dismantled and assembled rapidly and secured in the bearing arrangement 75. The bearing arrangement 75 also enables the step element 35 to be displaced perpendicular to the support surface 10 relative to the guide tube 78 which is fixedly joined to the chassis frame 3 by the bearing bracket 77. This is achieved by a helical compression spring 81 enclosing the bearing tube 79, which is supported on the step element 35 on the one hand and on a thrust bearing 82 disposed in the guide tube 78 on the other hand.

The spring tension of the helical compression spring 81 permits a vertical movement of the step element 35 in the direction of the support surface 10 when placed under load, as indicated by arrow 83, e.g., when the step levels 59, 60 are walked on. The locking mechanism 76 provided at the outer periphery of the step element 35, consisting of a brake arm 86 fixedly connected to the chassis frame 3 and disposed on an underside 85 of the step level 59 in the region of an outer contour line 61, and on which the step element 35 is supported when placed under load as indicated by arrow 83, restricts the displaceability of the pivot bearing arrangement (see displacement path 84) and checks the pivoting action. In order to increase friction, the underside 85 of the step level 59 is preferably provided with a brake pad 87.

This ensures that when the mounting device 36 is in a pivoted-out position and placed under load, for example when being used by the crew, any pivoting movement of the step element 35 is effectively prevented, thereby guaranteeing the safety of the crew without the need for additional locking mechanisms.

Naturally, it would also be possible to provide the operating mechanism 65 for the rotating step independently of the door in the form of a drive mechanism, e.g., a pneumatic cylinder, hydraulic cylinder, electric drive, etc.

It would also be possible to provide the light unit 72 on the internal surface 70 of the wall part 38 in the form of an electro-luminescent film 88 (see FIG. 4) known to those skilled in the art, which can be supplied with power via an appropriate control unit of the on-board power system of the truck 1. An electro-luminescent film 88 of this type could also be provided on front faces of the step levels 59, 60 to improve safety during darkness.

Figure 6:
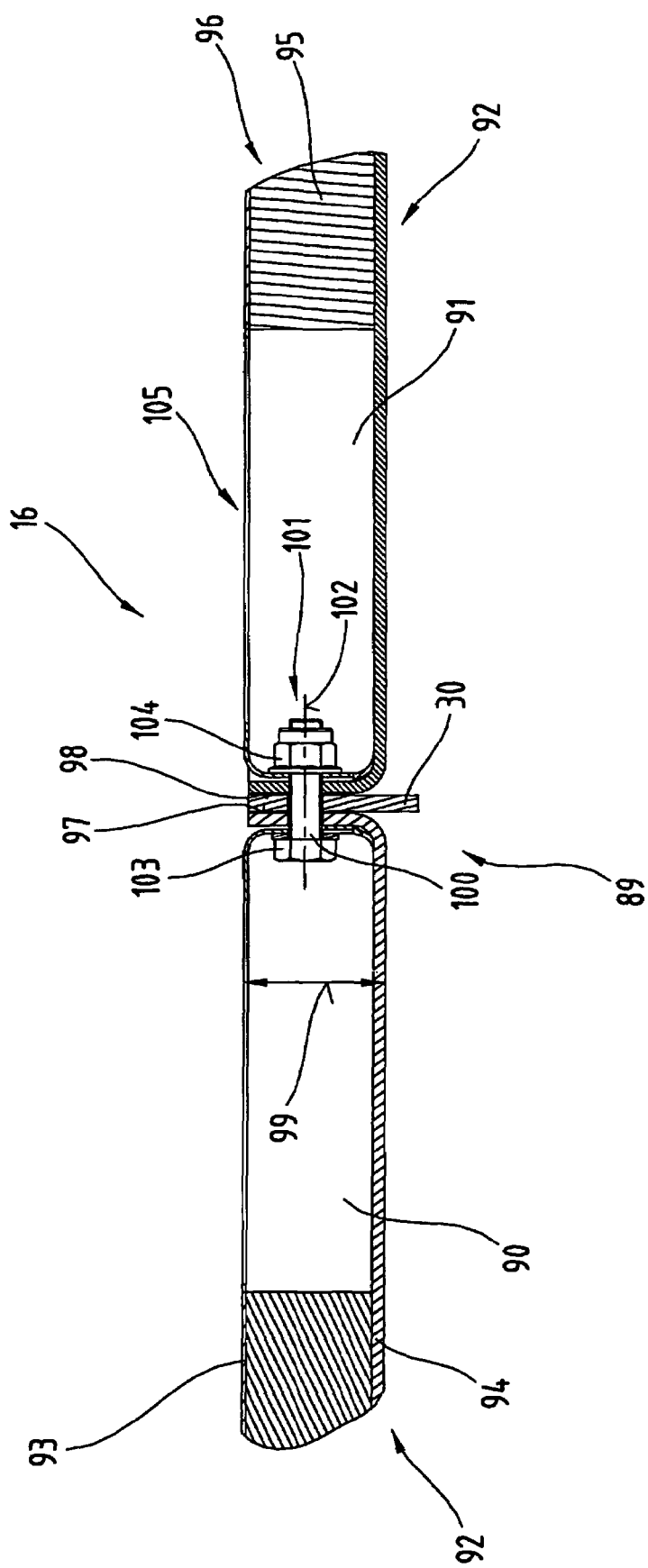
FIG. 6 shows a section through a connecting region of the structure of the truck proposed by the invention.

FIG. 6 illustrates a connection region 89 of the structure 16 of the truck 1 (not illustrated), a so-called node between mutually abutting longitudinal walls 90, 91 and the transverse wall 30. For reasons of stability and to provide heat insulation, it is preferable to use multi-layered panels 92 for the structure 16, in particular for the external cladding. These panels 92 comprise external facing layers 93, 94 and a core 95, by which the facing layers 93, 94 are retained at a distance, and which imparts strength to the panels 92 due to inserts, for example in a honeycomb pattern, joined to the front face of the facing layers 93, 94 and embedded in an insulation layer 96. Panels 92 of metal facing layers made from steel, lightweight metal alloys, or stainless steel are preferably used for the structure 16. The insulation layer 96 is preferably an open-cell plastic foam to impart a slight heat conductivity to these panels 92.

In order to provide front end faces 97, 98, the facing layers 93, 94 are bent back in the connection region 89 so that they extend at a right angle to one another and overlap across virtually a total thickness 99 of the panels 92. In the connection region 89, the transverse wall 30, made from sheet steel for example, is inserted between the oppositely lying end faces 97, 98 and screwed to the bent-back facing layers 93, 94 of the longitudinal walls 90, 91 by a fixing mechanism 100, e.g., through-bolts 101. A longitudinal mid-axis 102 of the through-bolt 101 extends more or less in the middle of the total thickness 99 of the panels 92 and perpendicular to the end faces 97, 98. It is preferable to use self-locking bolts for this purpose, in which case one of the facing layers 93, 94 has an orifice 105 in the region of the bolt head 103 and a threaded nut 104, so that the bolt connection can be tightened with the appropriate tools. The insulation layer 96 is also removed in certain areas in the region of the bolt connection.

A connection of this type enables a solid anchor to be obtained between the longitudinal walls 90, 91 and the transverse wall 30 extending transversely thereto, while simultaneously securing the facing layers 93, 94, effectively preventing these facing layers 93, 94 from becoming detached from the insulation layer 96 because the tension force of the bolt connection is transmitted into the bent-back facing layers 93, 94.

Figure 7:
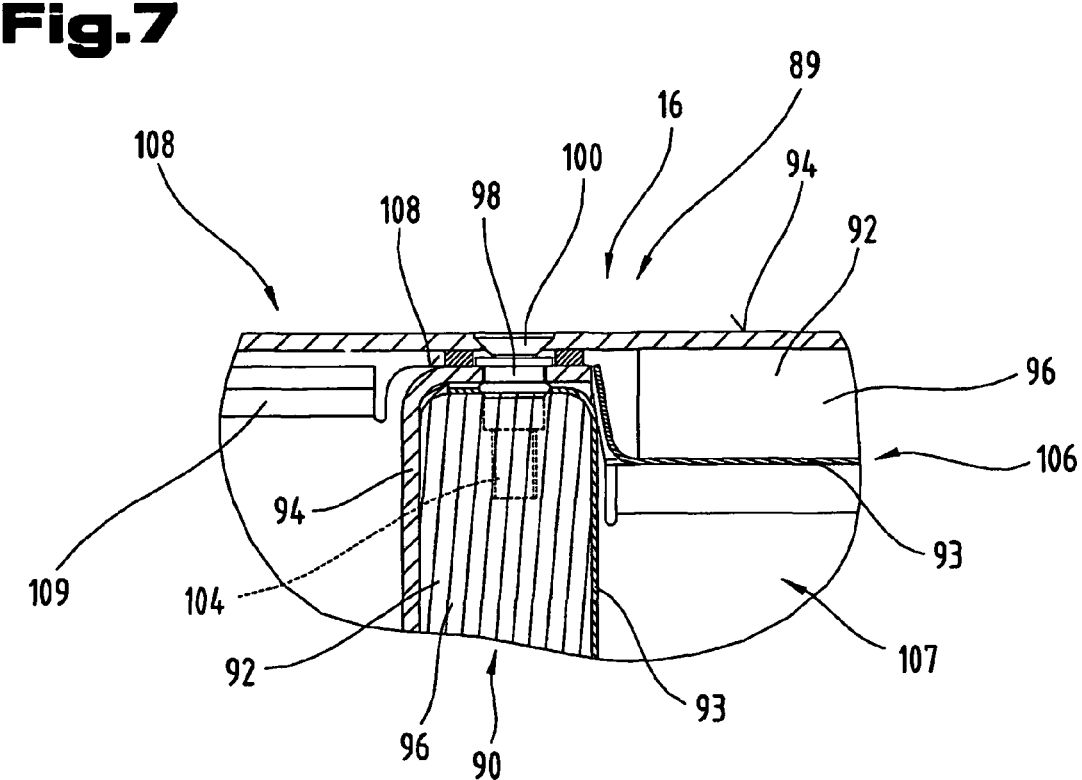
FIG. 7 shows a section through a different embodiment of the connecting region of the structure.

FIG. 7 illustrates another embodiment of the connection between the longitudinal wall 90 formed by the panels 92 and a roof panel 106 formed by the panels 92. In the region of an interior 107 of the structure 16, the roof panel 106 has the inner bent-back facing layer 93 forming the end face 97, while the outer facing layer 94 runs in extended form projecting beyond the longitudinal wall 90, and the insulation layer 96 terminates in the connection region 89. A region 108 of the facing layer 94 projecting beyond the longitudinal wall 90 is used to mount fixtures 109, e.g., external lighting, etc. As described above, the longitudinal wall 90 is provided with complementary, mutually facing bent-back overlapping facing layers 93, 94 forming the end face 98. The fixed connection between the roof panel 106 and the longitudinal wall 90 is provided by the fixing mechanism 100 extending perpendicular to the front face 98, which has a head countersunk in the facing layer 94 of the roof panel 106 in the embodiment illustrated as an example here and extends through the bent-back facing layers 93, 94 of the longitudinal wall 90 more or less in the middle of the total thickness 99 of the longitudinal wall 90, with the threaded nut 104 placed in a cut-out region in the region of the insulation layer 96.

Figure 8:
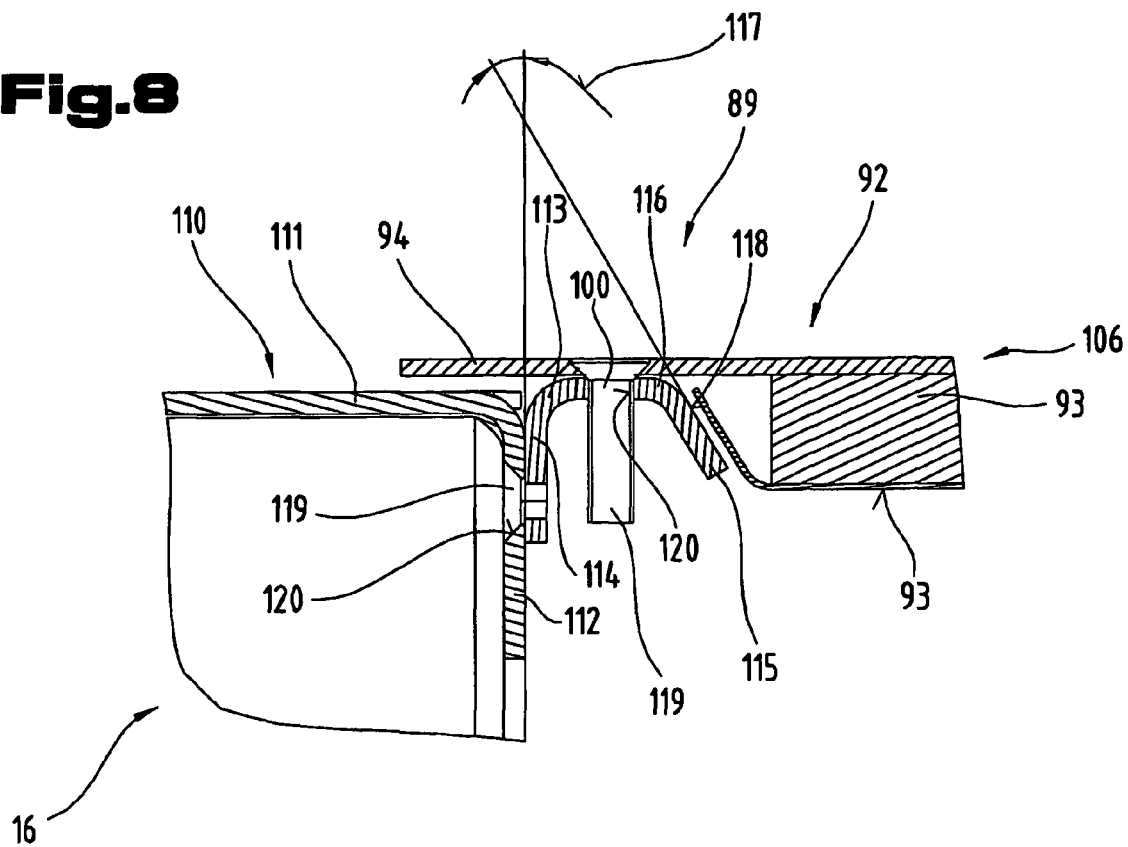
FIG. 8 shows a section through another embodiment of the connecting region of the structure of the truck.

FIG. 8 illustrates another variant of the connection region 89 between the panels 92 constituting the roof panel 106 and a structure part 110, e.g., a steel or sheet metal section, plastic section, etc., of the structure 16. With the outwardly extending facing layer 94, the panels 92 project across a leg 111 of the structure part 110. Secured to another leg 112 of the structure part 110, which is bent back more or less at a right angle to the leg 111, is a substantially U-shaped connecting section 113 with a first leg 114. Another leg 115 of the connecting section 113 is inclined relative to a base leg 116 extending perpendicular to the leg 114 so that a center angle 117 is less than 90 degrees. The other facing layer 93 of the panels 92, which is the inner one in the embodiment illustrated as an example here, projects beyond the insulation layer 96 and is bent back in the direction towards the facing layer 94 to form a complementary angle to the center angle 117, so that the resultant projection of the facing layer 93 extends in a plane formed by the leg 115 and hence parallel with the leg 115.

In the region where the leg 115 overlaps with the bent-back region of the facing layer 93, an adhesive layer 118 is provided in order to provide a sealed joint. The facing layer 94 abutting with the base leg 116 is screwed by connecting mechanism 100, e.g., countersunk threaded bolts 119, extending through the latter at a right angle, which co-operate with a threaded bore 120 provided in the base leg 116. Naturally, the fixing mechanism 100 might also be a through-bolt with threaded nut, rivet, etc. The connecting section 113 and the structure part 110 are secured in the same manner by the countersunk threaded bolt 119 and threaded bore 120 in the connecting section 113.

This ensures a sealed connection between the structure part 110 and the roof panel 106 which is prevented from moving, in the same way as between longitudinal side walls, transverse walls, etc.

Figure 9:
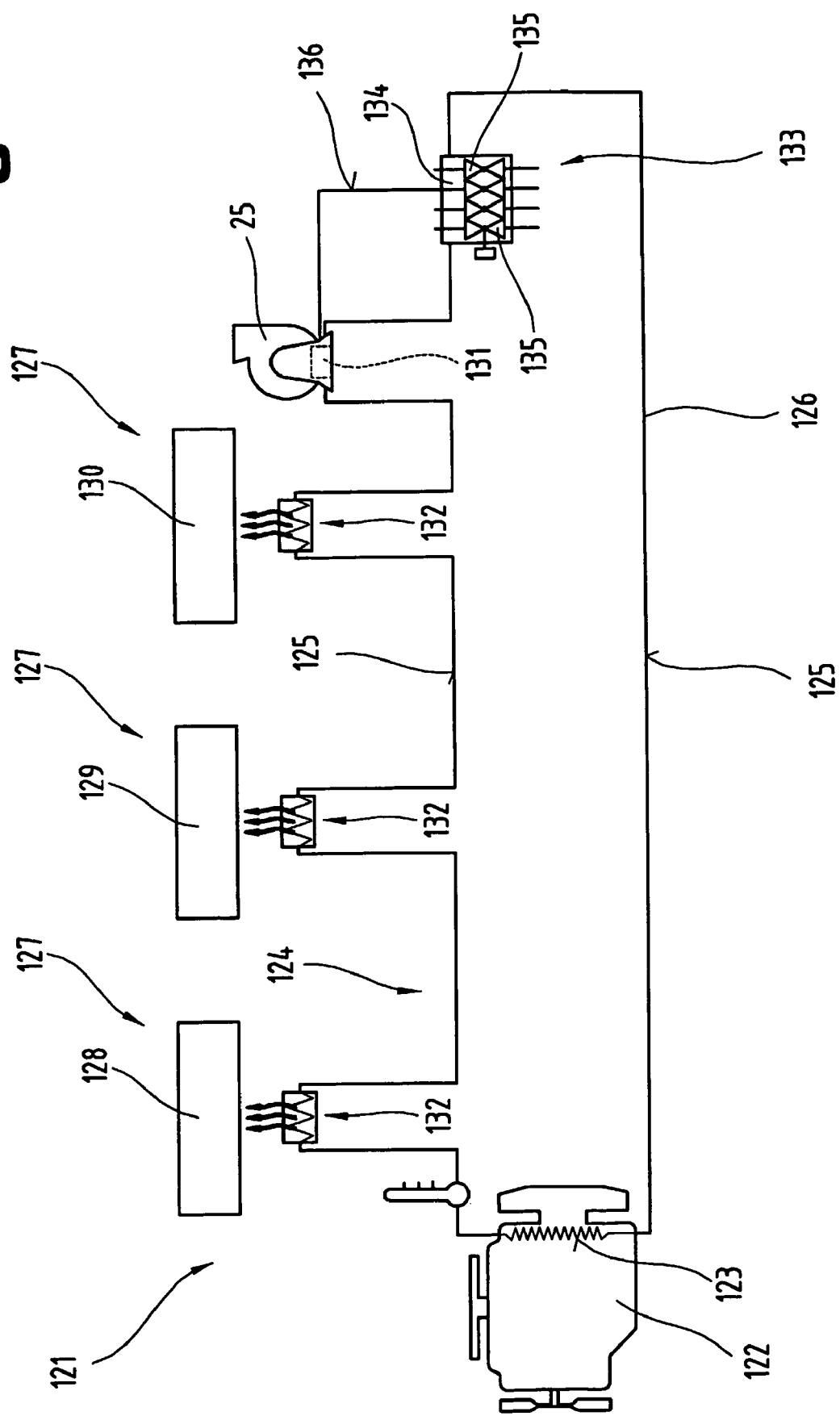
FIG. 9 is a schematic diagram showing a cooling and/or heating circuit of the truck proposed by the invention.

As maybe be seen from FIG. 9, the fire-fighting utility vehicle 2 is equipped with a heating system 121, in a manner known to those of skill in the art. The heat energy generated by a vehicle engine 122 and drawn from a cooling system 123 of the vehicle engine 122 is delivered via a heating circuit 124 incorporating appropriate supply lines 125 by a carrier medium 126 to various consumers 127, e.g., cab heating 128, pump room heating 129, pressure generator heating 130, and pump heating 131, after passing through appropriate heat exchangers 132. For the purposes of the invention, a valve system 133 is integrated in the heating circuit 124, comprising a valve block 134 through which the carrier medium 126 circulates, incorporating appropriate valves 135. Although this is illustrated by way of example in the case of the extinguisher pump 25 only, the valves 135 are connected to drainage lines 136. Consequently, when the valves 135 are opened, every connected system can be drained immediately in order to prevent water-conveying lines and systems from freezing and above all to protect the drainage valves 135 and prevent them from freezing.

Figure 10:
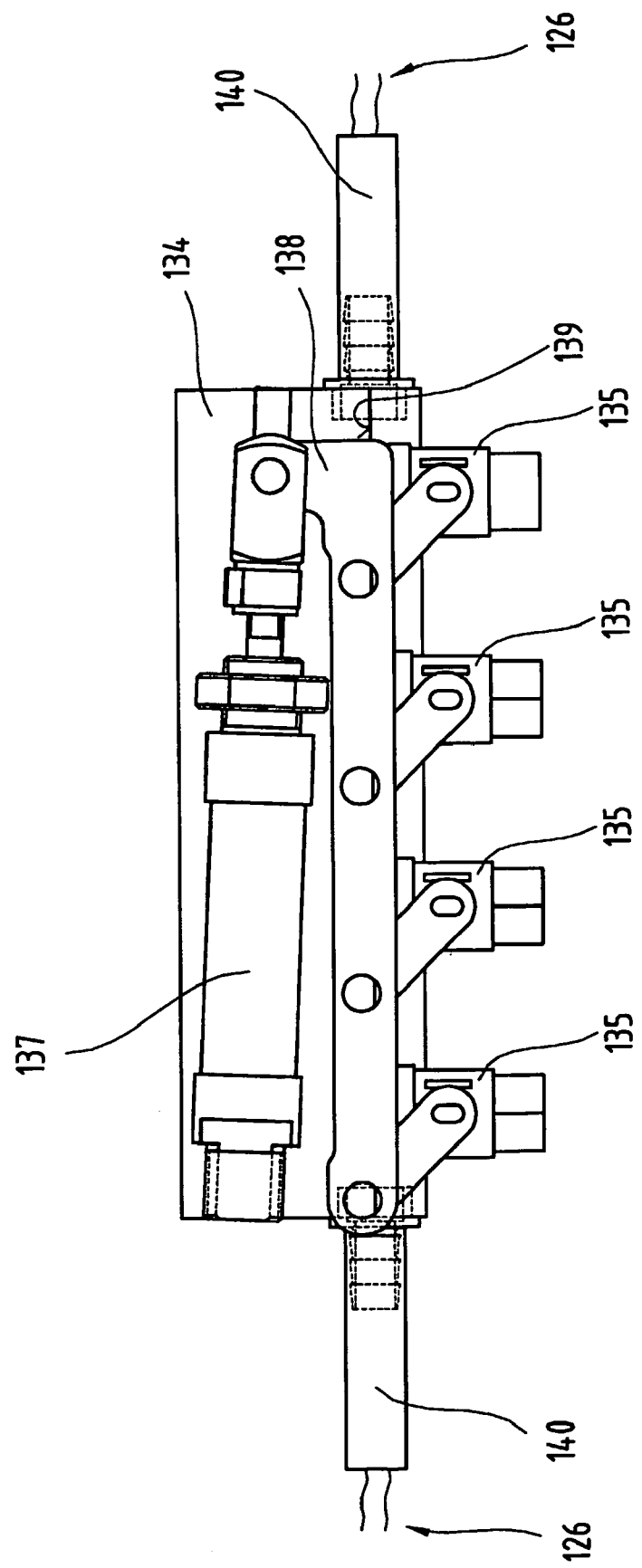
FIG. 10 shows a central drainage system for units and lines of the truck proposed by the invention.

As may be seen more clearly from FIG. 10, several of the valves 135 provided on the valve block 134 may be provided with a drive mechanism 137, e.g., a pressurized cylinder and appropriately designed operating elements 138 which can be commonly operated from a remote control center. The valve block 134 is connected to a passage 139 for the heating or carrier medium 126 in the heating circuit 124 by connecting lines 140, as a result of which it is constantly in operation due to operation of the vehicle engine 122 (see FIG. 9) used to supply the different units in a deployment situation and thus delivers heat which circulates with the heating or carrier medium 126, thereby providing an effective way to keep the valves used to drain the major lines free of ice.

Figure 11:
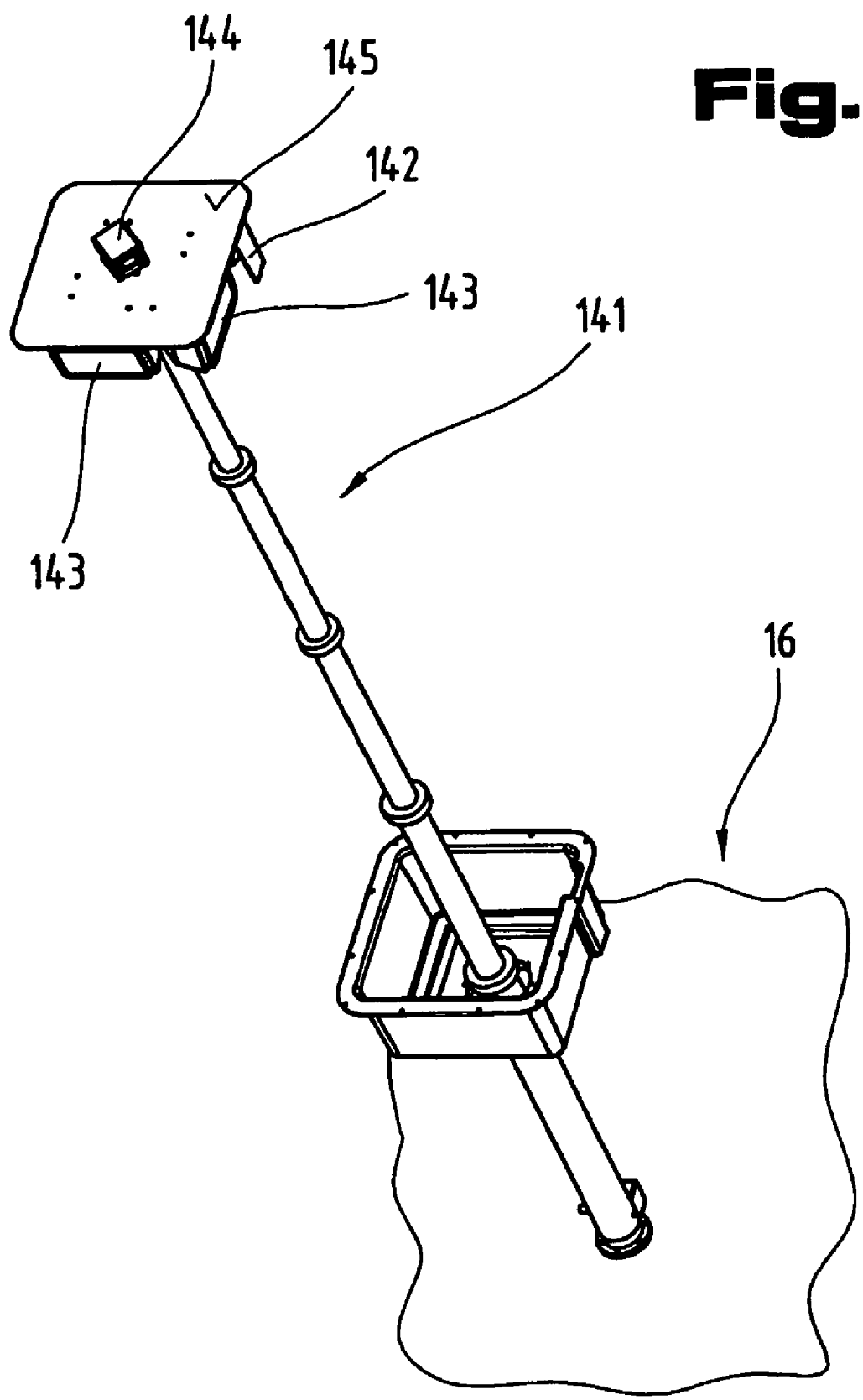
FIG. 11 shows lighting and/or camera fittings on an extractable mast of the truck proposed by the invention.

As may be seen from FIG. 11, the fire-fighting utility vehicle 2 may optionally be provided with a telescopically extendable mast 141 in the structure 16, in particular integrated in the structure 16, which, in addition to the known spot-lights 143 used to illuminate the deployment site, is equipped with at least one camera 144 at its extractable end region 142 for the purposes of the invention. This camera 144 enables the crew to observe the deployment site and the area around it on a monitor, which may be disposed in the crew and/or equipment cab for example or alternatively from a site that is independent of the site at which the command vehicle is being deployed. The camera 144 is preferably remotely controllable and mounted so as to be pivotable about two axes, a vertical axis and a horizontal axis, on a platform 145 above the spot-lights 143.

A deployment control center which does not have the deployment site in view will therefore be in a position to plan and co-ordinate deployment effectively.

As may also be seen from FIG. 1, a portable control and monitoring terminal 146 may also be provided, which may operate a wireless connection with the stationary control and monitoring unit 26 in the truck 1 whenever it is necessary to operate the control and monitoring terminal 146. This control and monitoring terminal 146 is equipped with the requisite control elements 147 and monitoring elements 148 which are essential for operating the technical apparatus, such as drive unit, auxiliary units, pump, spot-lights, tank, generator, mast, etc., and with communication systems 149, e.g., monitor, loudspeaker, microphone, etc. Accordingly, the deployment can be controlled and monitored irrespective of the site at which the crew is deployed. By networking several utility vehicles, essential data can be wirelessly transmitted to a central deployment command for monitoring and control purposes, in order to enhance the efficiency of a deployment still further through improved co-ordination.

For the sake of good order, it should be pointed out that in order to provide a clearer understanding of the structure of the truck, it and its constituent parts are illustrated to a certain extent out of scale and/or on an enlarged scale and/or on a reduced scale.

The objectives underlying the independent solutions proposed by the invention may be found in the description.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A fire-fighting truck having a direction of travel and a horizontal axis extending transversely to the travel direction, the truck comprising:
   a first structure mounted on a chassis frame with a driver's cab pivotable about the axis and at least one of a crew or equipment cab mounted on the chassis frame;
   a releasable connecting mechanism forming a passageway and permitting communication between the driver's cab and the crew or equipment cab, the connecting mechanism including a flexible bellows seal element which is secured by a fixing frame to a transverse wall of the crew or equipment cab and releasably connected to a rear wall of the driver's cab by a retaining connection;
   a mounting device provided in the region of at least one entry opening of the crew or equipment cab, wherein the bellows seal element has a stop frame facing a roof frame on the rear wall of the driver's cab which is retained in position relative to the transverse wall by a retaining arm; and
   a second structure independent of the driver's cab and the crew or equipment cab mounted on the chassis frame having built-in fixtures for storing tools and equipment and optionally having extinguisher units consisting of at least one tank for extinguisher medium and an extinguisher pump with a flow connection to the tank via extinguisher lines, and with entry or service openings in transverse or longitudinal side walls of the second structure.

2. The truck as recited in claim 1, wherein the roof frame on the rear wall of the driver's cab encloses certain regions of the bellows seal element.

3. The truck as recited in claim 1, wherein the retaining connection includes permanent magnets disposed in the stop frame.

4. The truck as recited in claim 3, wherein several permanent magnets are disposed in the stop frame, spaced apart from one another in the circumferential direction of the stop frame.

5. The truck as recited in claim 1, further comprising elastic absorber elements provided on the roof frame facing the stop frame.

6. The truck as recited in claim 1, wherein the stop frame is a hollow rectangular section defining a cavity.

7. The truck as recited in claim 6, wherein the retaining connection includes permanent magnets disposed in the cavity of the hollow rectangular section.

8. The truck as recited in claim 1, wherein the roof frame is a blanking section with a substantially L-shaped cross section, the roof frame having a first leg securing the roof frame to the rear wall and a second leg projecting at a right angle in the direction of the transverse wall.

9. The truck as recited in claim 8, wherein a second leg has a length approximately two-thirds of a distance between the rear wall and the transverse wall.

10. The truck as recited in claim 1, further comprising a frame section having an approximately U-shaped cross section and securing the bellows seal element to one of the transverse wall or to a cut-out in the transverse wall.

11. The truck as recited in claim 1, wherein the bellows seal element is made from a material selected from the group consisting of flexible, rubber-backed linen fabric and fiber-reinforced plastic.

12. The truck as recited in claim 1, further comprising an adjustable supporting rope system or a spring arrangement disposed between the retaining arm and the stop frame.

13. The truck as recited in claim 1, further comprising a spring arrangement disposed between the retaining arm and the stop frame, the spring arrangement having adjusting means for adjusting the position of the stop frame relative to the transverse wall.

14. The truck as recited in claim 10, wherein the stop frame is made from aluminium while the roof frame and the frame section are made from sheet steel.

15. The truck as recited in claim 1, wherein the mounting device is a multi-level step element which is pivotable within an external boundary of the first structure about a pivot axis extending perpendicular to a support surface.

16. The truck as recited in claim 15, wherein the step element is pivotable from a pivoted-in position, in which a wall part extends flush with the external boundary, into a pivoted-out position, in which the wall part assumes an angle of between 0 and 90 degrees.

17. The truck as recited in claim 15, further comprising a brake arm fixedly connected to the first structure when placed under load, the brake arm having a step projection with an underside, and wherein the step element is supported by the underside of the step projection on the brake arm irrespective of the pivoted position it assumes.

18. The truck as recited in claim 17, further comprising a brake pad on the brake arm.

19. The truck as recited in claim 15, wherein the step element is mounted on the pivot axis so as to be displaceable in the direction of the support surface against the action of a spring force.

20. The truck as recited in claim 15, wherein the step element defines an interior and the truck further comprises a stowage compartment provided in the interior of the step element.

21. The truck as recited in claim 16, further comprising a light unit, with a light-emitting surface in the direction of the step element, provided in the wall part in the region of the step element.

22. The truck as recited in claim 21, wherein the light unit is an electro-luminescent film disposed on a surface of the wall part or the step element.

23. The truck as recited in claim 1, wherein the second structure has walls in the form of panels with facing layers and insulation layers.

24. The truck as recited in claim 23, wherein the panels have end faces forming overlapping bent-back legs of the facing layers.

25. The truck as recited in claim 24, wherein the panels have at least one of corner or abutting connections and the truck further comprises fixing means engaging the at least one corner or abutting connections and having a longitudinal extension perpendicular to the end faces.

26. The truck as recited in claim 25, wherein the fixing means creates tension forces acting in the direction perpendicular to the end faces of the panels.

27. The truck as recited in claim 1, further comprising:
  an engine having at least one of a cooling or heating circuit and through which cooling or heating medium is circulated;
  an extinguisher system including an extinguisher pump, a pressure-suction line, pump lines, and extinguisher lines; and
  a drainage valve block incorporating valves in the pressure-suction line of the extinguisher system, the valves operating with the extinguisher pump, pump lines, and extinguisher lines and establishing a flow connection with the at least one cooling or heating circuit.

28. The truck as recited in claim 1, further comprising a mast, displaceable in the direction perpendicular to a support surface and disposed on the second structure as a support for lighting, and at least one camera positioned on the mast.

29. The truck as recited in claim 1, further comprising a control and monitoring unit and a removable, portable control and monitoring terminal which wirelessly communicates with the control and monitoring unit.

* * * * *